Patented May 7, 1935

2,000,622

UNITED STATES PATENT OFFICE 2,000,622

CELLULOSE ACETATE COMPOSITION COMPRISING A TERTIARY ALCOHOL

Ernest R. Taylor, Rochester, N. Y., assignor to Eastman Kodak Company, Rochester, N. Y., a corporation of New York No Drawing. Application February 2, 1932, Serial No. 590,510

2 Claims. (Cl. 106—40)

This invention relates to compositions of matter in which cellulose acetate is combined or mixed with solvents or solvent mixtures, with or without a compatible plasticizer, and with or without other useful addition agents, and to products produced from such compositions. One object of this invention is to produce compositions of matter from which may be manufactured permanently transparent, strong and flexible sheets or films of desired thinness which are substantially waterproof, are unaffected by ordinary photographic fluids, and possess the desired properties of a support for sensitive photograhic coatings. Another object of my invention is to produce compositions of matter which are capable of easy and convenient manipulation in the plastic and analogous arts, such as in the manufacture of wrapping sheets or tissue, films, artificial silk filaments, varnishes or lacquers, coating compositions and the like, and to produce compositions which will not injure, or be injured by, the substances or surfaces with which they are associated during manufacture. Other objects will become apparent to those skilled in the art to which this invention pertains.

I have discovered that unusual flexibility may be induced in and/or contributed to compositions containing cellulose acetate, by using as a constituent of the solvent mixture used for colloidizing the cellulose acetate, a substantial quantity of a tertiary alcohol, such as tertiary butyl alcohol or tertiary amyl alcohol, which have only recently become commercially available.

Examples of the solvent mixtures which I may use are:

| | Percent |
|---|---|
| Ethylene chloride | 95–65 |
| Tertiary amyl alcohol | 5–35 |

| | Percent |
|---|---|
| Ethylene chloride | 95–75 |
| Tertiary butyl alcohol | 5–25 |

| | Percent |
|---|---|
| Acetone | 75 |
| Tertiary amyl alcohol | 25 |

| | Percent |
|---|---|
| Propylene chloride | 75 |
| Tertiary butyl alcohol | 25 |

These formulæ are given merely as illustrations, and not by way of limitation. I may use the tertiary alcohols with any other liquid with which they are compatible, which is a solvent for cellulose acetate, or which becomes a solvent upon the addition of a tertiary alcohol. From 400 to 500 parts by weight, approximately, of the solvent mixture suffice to dissolve 100 parts by weight of cellulose acetate, to a clear solution. When a mixture of propylene chloride with a tertiary alcohol is used, it is necessary to use a somewhat elevated temperature (approximately 40° C.) in order to complete the solution. If it is desired merely to form a paste, such as is used in the manufacture of sheets, rods, tubes, etc., a smaller proportion of solvent mixture will suffice. While the addition of plasticizers does not, in general, greatly improve the flexibility of films made from our compositions, various compounds may be added for decreasing flammability or for giving whatever improvement in properties they are capable of imparting.

For the manufacture of photographic film or sheet, my invention may be carried out, for example, as follows: 100 parts of acetone-soluble cellulose acetate, i. e. cellulose acetate containing from 36% to 42% acetyl radical, approximately, is dissolved with stirring at atmospheric temperature in about 500 parts by weight of a mixture consisting of approximately 75% ethylene chloride and 25% tetiary amyl alcohol. The composition of matter so prepared may be deposited upon any suitable film-forming surface to form a film or sheet, in a manner well known to those skilled in the art. It will be understood that this example is merely one illustration of the compositions and proportions which I may use.

It has been known to add relatively small amounts of butyl and amyl alcohols, for instance in the form of fusel oil, to cellulose acetate compositions to increase the flexibility of films made therefrom. Fusel oil, however, does not contain appreciable amounts of the tertiary alcohols. Very careful anaylsis reveals only a very small amount of tertiary butyl alcohol in some samples and none in others, while the presence of tertiary amyl alcohol in fusel oil has never even been reported. Certainly no one has hitherto appreciated the value of the tertiary alcohols as such, in appreciable proportions, as flexibilizing agents for cellulose acetate. Furthermore, the butyl and amyl alcohols hitherto available on the market, such as the normal and secondary butyl and amyl alcohols, could not be added to cellulose acetate compositions in amounts greater than approximately 10% without causing the films made therefrom to be translucent or opaque due to blushing. In some cases incomplete solution resulted when an attempt was made to incorporate more than 10% of these alcohols into a cellulose acetate composition.

It has also been known to add methyl and ethyl alcohols to ethylene chloride to form solvents for cellulose acetate. These can be incorporated in amounts greater than 10%, but an increase in the proportion of alcohol in the solvent mixture from 10% to 25%, for instance, does not result in any considerable increase in the flexibility of the films made from the resulting cellulose acetate compositions. I have discovered, however, that as the proportion of tertiary butyl alcohol or of tertiary amyl alcohol in the solvent mixture is increased, the flexibility of the films made from the resulting cellulose acetate compositions increases markedly. When the tertiary alcohols are used with ethylene chloride, I have found the optimum percentages of the tertiary alcohols in the solvent mixtures to be approximately 25% for tertiary butyl alcohol, and approximately 35% for tertiary amyl alcohol.

To prepare the cellulose acetate films for flexibility tests, they are kept for a definite period at a definite elevated temperature to free them from appreciable amounts of residual solvents, and are then allowed to cool to atmospheric temperature. They are then tested on a modified Schopper fold-tester, such as is commonly used in testing cellulose derivative films. I give below the results of flexibility tests on cellulose acetate films coated from solvent mixtures consisting of ethylene chloride and varying percentages of different alcohols.

| Solvent | Folds withstood |
|---|---|
| 90% ethylene chloride / 10% methyl alcohol | 6 |
| 75% ethylene chloride / 25% methyl alcohol | 7 |
| 90% ethylene chloride / 10% ethyl alcohol | 6 |
| 75% ethylene chloride / 25% ethyl alcohol | 8 |
| 90% ethylene chloride / 10% n-butyl alcohol | 9 |
| 90% ethylene chloride / 10% sec.-butyl alcohol | 8 |
| 90% ethylene chloride / 10% sec.-amyl alcohol | 8 |
| 90% ethylene chloride / 10% tert.-butyl alcohol | 9 |
| 75% ethylene chloride / 25% tert.-butyl alcohol | 16 |
| 90% ethylene chloride / 10% tert.-amyl alcohol | 8 |
| 75% ethylene chloride / 25% tert.-amyl alcohol | 12 |

Films coated from solvent mixtures consisting of acetone and a tertiary alcohol or of propylene chloride and a tertiary alcohol also show unusual flexibility. A cellulose acetate film coated from solution in a solvent mixture consisting of 75% acetone and 25% tertiary amyl alcohol withstood 19 folds on the modified Schopper fold-tester, and a film coated from solution in 75% propylene chloride and 25% tertiary butyl alcohol withstood 15 folds, whereas a film coated from solution in acetone alone withstood only 5 folds.

Furthermore, cellulose acetate films coated from solution in solvents comprising tertiary alcohols show good flexibility retention. For instance, a film coated from a solvent mixture consisting of 75% ethylene chloride and 25% tertiary butyl alcohol, and a film coated from a solvent mixture consisting of 75% ethylene chloride and 25% tertiary amyl alcohol, both remained flexible after having been kept at a temperature of 65° C. for more than 112 days. This retention of flexibility is remarkable in view of the relatively low boiling points of the tertiary alcohols. The tertiary alcohols have boiling points considerably below those of their respective isomers. Tertiary amyl alcohol has a boiling point of 102° C., and tertiary butyl alcohol has a boiling point of only 83° C. The flexibility at the end of 112 days at 65° C. of films coated from solvents comprising the tertiary alcohols can, therefore, scarcely be due to the retention of appreciable amounts of the tertiary alcohols in the films.

What I claim as my invention and desire to be secured by Letters Patent of the United States is:

1. A composition of matter comprising cellulose acetate dissolved in a solvent consisting of propylene chloride and a substantial proportion of a tertiary alcohol containing less than 6 carbon atoms.

2. A transparent, flexible sheet of cellulose acetate, deposited from solution in a solvent consisting of propylene chloride and a substantial proportion of a tertiary alcohol containing less than 6 carbon atoms.

ERNEST R. TAYLOR.